United States Patent
Owens et al.

(10) Patent No.: US 10,982,702 B2
(45) Date of Patent: Apr. 20, 2021

(54) METHOD OF FASTENING A PANEL

(71) Applicant: BAE SYSTEMS plc, London (GB)

(72) Inventors: Kenneth Owens, Barrow (GB); Russell William Peters, Barrow (GB); Alan Thomas Harris, Barrow (GB)

(73) Assignee: BAE SYSTEMS PLC, London (GB)

( * ) Notice: Subject to any disclaimer, the term of this patent is extended or adjusted under 35 U.S.C. 154(b) by 272 days.

(21) Appl. No.: 16/332,667

(22) PCT Filed: Aug. 21, 2017

(86) PCT No.: PCT/GB2017/052467
§ 371 (c)(1),
(2) Date: Mar. 12, 2019

(87) PCT Pub. No.: WO2018/051060
PCT Pub. Date: Mar. 22, 2018

(65) Prior Publication Data
US 2020/0116186 A1 Apr. 16, 2020

(30) Foreign Application Priority Data

Sep. 13, 2016 (EP) .................................... 16275134
Sep. 13, 2016 (GB) .................................... 1615527

(51) Int. Cl.
*F16B 21/20* (2006.01)
*F16B 5/06* (2006.01)
*F16B 15/00* (2006.01)

(52) U.S. Cl.
CPC ............ *F16B 21/20* (2013.01); *F16B 5/0692* (2013.01); *F16B 15/0023* (2013.01); *F16B 15/0053* (2013.01); *F16B 2015/0076* (2013.01)

(58) Field of Classification Search
CPC .......... F16B 15/0053; F16B 2015/0076; F16B 15/0023; F16B 15/0046; F16B 5/0692; F16B 5/0642; F16B 5/0664; F16B 21/20
(Continued)

(56) References Cited

U.S. PATENT DOCUMENTS 3,343,227 A * 9/1967 Brown ................ E04F 13/0835
52/408
3,523,395 A * 8/1970 Konrad ................. F16B 37/145
52/410
(Continued)

FOREIGN PATENT DOCUMENTS

DE 3336856 A1 4/1985
GB 1218076 A * 1/1971 .......... F16B 15/0053
(Continued)

OTHER PUBLICATIONS

NPL#1: Washers, Wikipedia, Jul. 4, 2015, <https://web.archive.org/web/20150704120843/https://en.wikipedia.org/wiki/Washer_(hardware)> (Year: 2015).*
(Continued)

*Primary Examiner* — Victor D Batson
*Assistant Examiner* — Amit Singh Dhillon
(74) *Attorney, Agent, or Firm* — Finch & Maloney PLLC

(57) ABSTRACT

A fastener includes a self-locking pin washer and at least one elongate projection mounted on the self-locking pin washer, where the self-locking pin washer is arranged to be a resistance fit to a projection mounted on a structure or vehicle. A method of fastening a panel to a substrate includes attaching a fastener to a projection of a substrate, wherein the fastener includes an elongate projection that is longer than the projection. The method further includes attaching a panel onto the elongate projection of the fastener.

20 Claims, 2 Drawing Sheets

(58) Field of Classification Search
USPC .................................... 52/407.4, 404.2, 410
See application file for complete search history.

(56) References Cited

U.S. PATENT DOCUMENTS

| | | | | | |
|---|---|---|---|---|---|
| 4,139,975 | A | * | 2/1979 | Baker | F16B 5/00 411/520 |
| 4,288,951 | A | * | 9/1981 | Carlson | E04D 13/1606 52/262 |
| 4,397,128 | A | * | 8/1983 | Wolde-Tinsae | E04B 2/30 52/293.2 |
| 5,673,525 | A | * | 10/1997 | Keith | B28B 19/003 411/487 |
| 5,701,711 | A | * | 12/1997 | Bases | F23M 5/04 52/404.1 |
| 2015/0219270 | A1 | * | 8/2015 | Martin | F16B 15/00 219/98 |

FOREIGN PATENT DOCUMENTS

| | | |
|---|---|---|
| GB | 1218076 A | 1/1971 |
| GB | 2341216 A | 3/2000 |
| JP | S63166713 A | 7/1988 |
| JP | H0854010 A | 2/1996 |
| WO | 2014207145 A1 | 12/2014 |
| WO | 2018051060 A1 | 3/2018 |

OTHER PUBLICATIONS

NPL#2: Cap Nuts, Bolt Products Inc., Jul. 16, 2016, <https://web.archive.org/web/20160716153020/https://www.boltproducts.com/cap-nuts.html> (Year: 2016).*

International Search Report and Written Opinion received for PCT Application No. PCT/GB2017/052467, dated Nov. 15, 2017. 12 pages.

GB Search Report received for GB Application No. 1615527.7, dated Jan. 30, 2017. 3 pages.

EP Search Report received for EP Application No. 16275134.1, dated Feb. 23, 2017. 9 pages.

International Preliminary Report on Patentability received for PCT Application No. PCT/GB2017/052467, dated Mar. 28, 2019. 7 pages.

* cited by examiner

METHOD OF FASTENING A PANEL

FIELD OF THE INVENTION

The invention relates to a method of fastening panels to a substrate, and a fastener.

BACKGROUND

Structures such as, for example walls, vehicles are often insulated or protected with fire retardants, which may be in the form of panels. The use of panels allows the structure to be completed and the panels to be fitted as one of the last steps. Further panels may be readily refitted or retrofitted, should the panel be damaged or the panel material is no longer compliant with industry standards.

Panels are typically mechanically fastened to a structure using screws where the panel is screwed into the wall, or more expediently pins may directly welded to the substrate and project therefrom, such that the panel may at a later date be simply pushed onto the pins and capped off. The pin solution provides a facile means of connection, however the pins may project for example 10 to 20 cm from the surface, therefore this presents a snag or stab hazard to those working close by. The typical solution is to bend the pins over such that the pin is substantially parallel with the substrate.

According to a first aspect of the invention there is provided a method of fastening a panel to a substrate, comprising the steps of
i. providing on the substrate a first projection,
ii. attaching a fastener, to said first projection, wherein said fastener comprises an elongate projection, wherein the elongate projection is longer than said first projection,
iii. attaching a panel onto said elongate projection.

The prior art methods require the use of very long pins directly welded to the substrate or structure, and bending them over until such time that they are used, to mitigate against a snag or stab hazard. The bending and straightening action may result in the weakening of the pin, such that the pin snaps. Further there may be a significant number of pins per structure, each of which requires two separate process steps (bending over, and re-straightening), to yield a usable pin. The process of the current invention allows a very small first projection, which only needs to of a length which is sufficient to be gripped by the fastener, such as for example the length of the first projection may be less than 50 mm, preferably in the range of 5 to 20 mm.

In a preferred arrangement the fastener comprises a self-locking pin washer, which engages with the first projection. The self-locking pin washer may be a resistance fit on the first projection. The self locking pin washers are typically metal washers which comprises a plurality of splines which extend radially inwards to a small aperture. In use the aperture is smaller than the diameter of the first projection, and the washer is forced onto the first projection, thereby deforming the splines which engage with the first projection, to provide a resistance fit.

Preferably the elongate projection may be longer than said first projection. The elongate projection may be attached to the fastener by welding, adhesive or resistance fit. There may be a plurality of elongate projections mounted on the fastener to provide further grip to the panel mounted thereon.

The elongate projection may be longer than the thickness of said panel, to ensure retention of the panel on the pin. Further the elongate projection may comprises a cap located thereon, after it has protruded through the panel.

The first projection may be blunt, such as rounded off, to mitigate against snagging risk should a user come into contact with the first projection. The elongate projection may comprise a sharpened point, a barb, or may be pronged, to engage more easily with the panel, further, the elongate projection may have a high friction surface along its shaft, to retain said panel when mounted thereon. The high friction surface may be ribs or ridges, alternatively an adhesive.

The panel may be manufactured from any commonly made panel material, such as, for example the material may be selected from fibres, foamed polymers, foamed monomers, gels, natural cellulose bundles, loose filled panels, and composite laminates.

The panel may be a thermal barrier panel, it may provide insulation and/or fire retardants.

The substrate may form part of a building, vessel or craft.

According to a further aspect of the invention there is provided a fastener suitable for attaching panels to a building, vessel or craft, wherein said fastener comprises a self-locking pin washer and mounted thereon at least one elongate projection, wherein said self locking pin washer is arranged to be a resistance fit to a first projection mounted on a substrate on said building, vessel or craft.

According to yet a further aspect of the invention there is provided a vessel or craft comprising a substrate, said substrate comprising a first projection mounted thereon, located thereon by a resistance fit a fastener as defined herein, and a panel located on said faster.

In a further arrangement the first projection may extend through the pin washer, to allow the first projection and elongate projection to fasten said panel. Preferably the elongate projection is adjacent to the first projection, to allow both first and elongate projections to fasten to the panel.

DETAILED DESCRIPTION

Figure 1A:
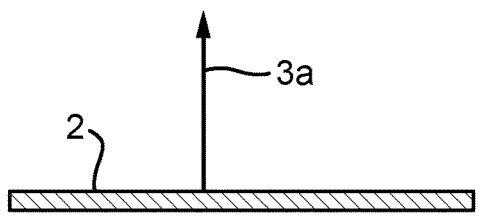
FIGS. 1a-e shows a prior art method of fixing a panel to a substrate.
Figure 1B:
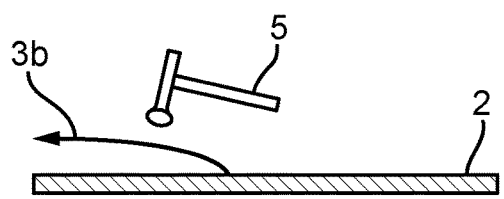
Figure 1C:
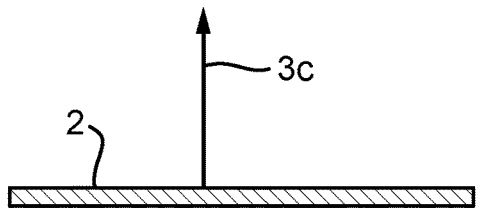
Figure 1D:
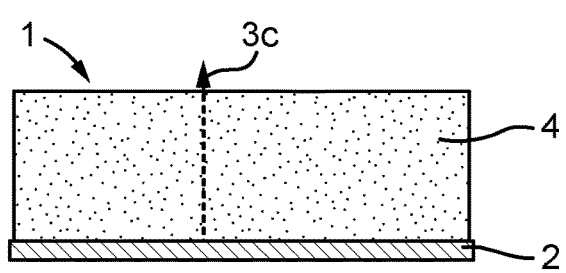
Figure 1E:
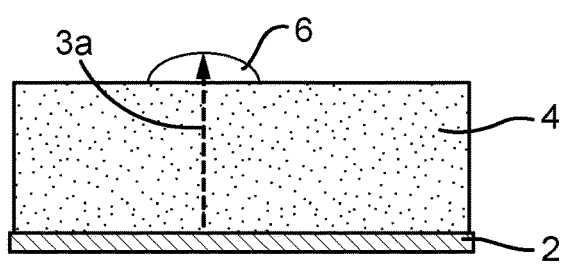

Turning to FIG. 1 there is shown a schematic of a prior art process for fixing a panel 4 to a substrate 2 to provide a vessel, craft or building with a paneled surface 1. Typically the substrate 2 comprises a plurality of pins 3a which may be welded substantially perpendicular to the surface. To avoid snagging or injury, a hammer 5 is usually used to bend the pin 3b to a positon which is more parallel to the substrate 2. A period of time may elapse before the pin 3c is re-straightened, the bending over and re-straightening process may weaken the pin 3c.

Figure 2A:
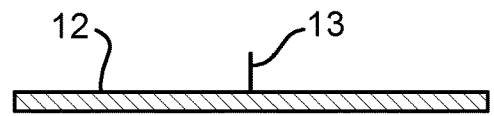
FIGS. 2a-e shows a method of fixing a panel to a substrate.
Figure 2B:
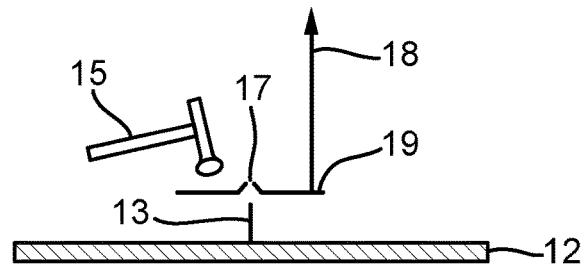
Figure 2C:
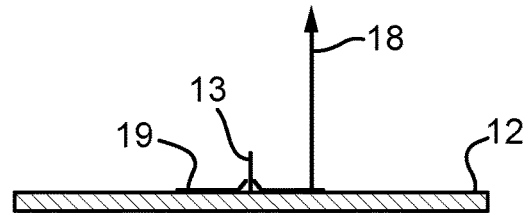
Figure 2D:
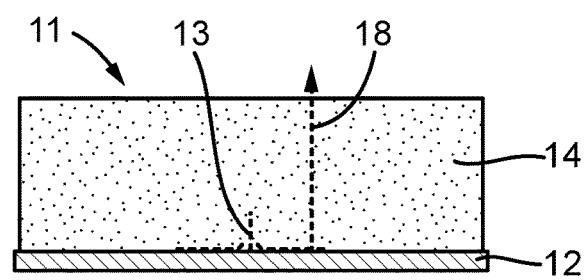
Figure 2E:
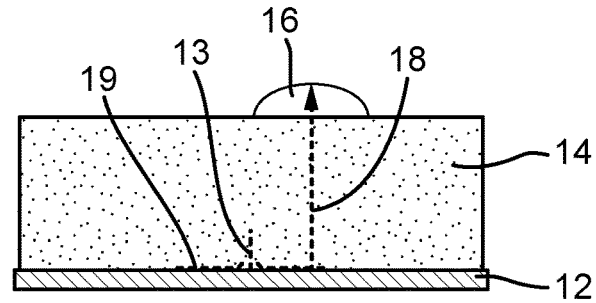

A panel 4 may then be pushed onto the pin 3c, and finally retained in place by a cap 6 Turning to FIG. 2 there is provided an improved method of fixing a panel 14 onto a substrate 12 to provide a vessel, craft or building with a panelled surface 11.

The substrate 12 is provided with a first projection pin 13, which may be of nominal length, typically less than 20 mm, such that it significantly reduces the risk of snagging or injury to people walking past. Further the first projection pin 13 may have a blunt end, as it does not need to readily penetrate into the panel 14.

At a time when the panel is to be fitted, a fastener 19, which comprises a self-locking pin washer 17 with an elongate projection pin 18 attached thereto, is tapped into place with a hammer 15 to locate the self-locking pin washer part onto the first projection 13. Once all of the fasteners 19 are in place, the panel 14 may be located over the elongate projection pin 18 and first projection pin to provide a paneled surface. Finally the panel 14 may be retained in place by a cap 16. The cap may further prevent injury or snagging, on the installed panel.

The invention claimed is:

1. A method of fastening a panel to a substrate, the substrate having a projection, the method comprising:
    attaching a fastener to said projection, wherein said fastener comprises
        an elongate projection, wherein the elongate projection is longer than said projection, and
        a self-locking pin washer, which engages the projection and is a resistance fit on the projection; and
    attaching the panel onto said elongate projection.

2. The method according to claim 1, wherein the elongate projection comprises a barb, is pronged, and/or has a high friction surface, to retain said panel.

3. The method according to claim 1, wherein the panel is manufactured from a material selected from fibres, foamed polymers, foamed monomers, gels, natural cellulose bundles, loose filled panels, and composite laminates.

4. The method according to claim 1, wherein the panel is a thermal barrier panel.

5. The method according to claim 1, wherein the elongate projection is attached to the fastener by welding, adhesive, or resistance fit.

6. The method according to claim 1, wherein the substrate forms part of a building, vessel or craft.

7. The method according to claim 1, wherein the elongate projection is longer than a thickness of said panel.

8. The method according to claim 7, further comprising a cap located on an end of the elongate projection that extends through the thickness of the panel.

9. The method according to claim 1, wherein the projection extends through the self-locking pin washer, to allow the projection and elongate projection to fasten said panel.

10. The method according to claim 1, wherein the elongate projection is adjacent to the projection.

11. The method according to claim 1, wherein prior to attaching the fastener to said projection, the method further comprises: providing said projection on the substrate.

12. The method of claim 1, wherein the self-locking pin washer comprises a plurality of splines extending radially inwards to an aperture of the pin washer.

13. The method of claim 12, wherein the aperture is smaller than a diameter of the projection.

14. A fastener suitable for attaching panels to a building, vessel or craft, wherein said fastener comprises a self-locking pin washer and mounted thereon at least one elongate projection, wherein said self-locking pin washer is arranged to be a resistance fit to a projection mounted on said building, vessel or craft.

15. A vessel or craft comprising:
    the fastener according to claim 14, and
    a panel located on said at least one elongate projection, wherein the fastener is resistance fit fastened to a projection mounted on the vessel or craft.

16. The fastener according to claim 14, wherein the projection mounted on the vessel or craft extends through the pin washer to allow the projection and elongate projection to fasten to said panel.

17. The fastener according to claim 14, wherein the projection is less than 20 mm long.

18. The fastener according to claim 14, wherein the elongate projection extends through said panel, the fastener further comprising a cap on an end of the elongate projection.

19. A fastener comprising a self-locking pin washer and at least one elongate projection mounted on said self-locking pin washer, wherein said self-locking pin washer is arranged to be a resistance fit to a projection mounted on a structure or vehicle.

20. A structure or vehicle comprising:
    the fastener according to claim 19, and
    a panel located on said at least one elongate projection, wherein the fastener is resistance fit fastened to a projection mounted on the structure or vehicle, and wherein the at least one elongate projection is longer than said projection mounted on the structure or vehicle.

* * * * *